Jan. 22, 1963  O. E. ROSAEN  3,074,556
FLUID FILTERING MECHANISM
Filed April 25, 1960  2 Sheets-Sheet 2
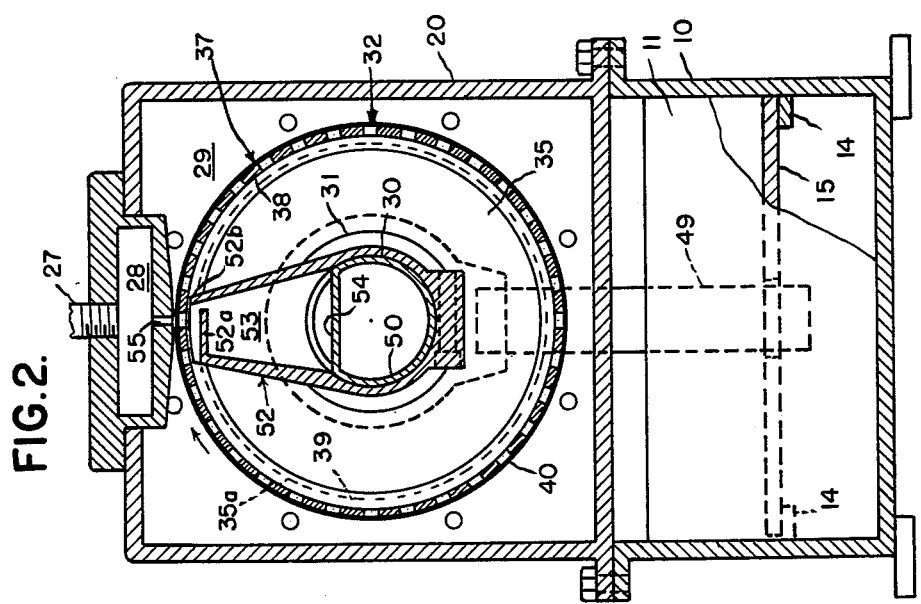
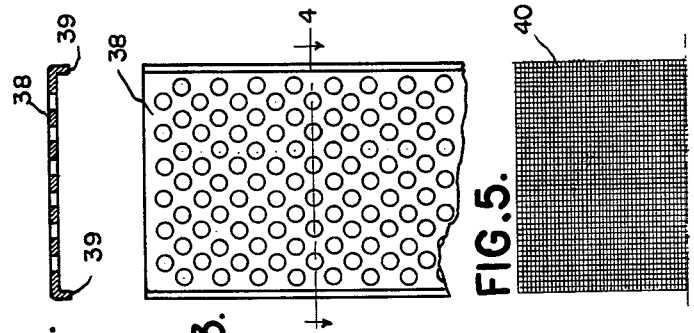
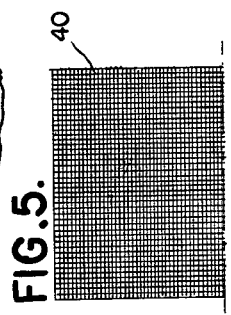
INVENTOR.
OSCAR E. ROSAEN
BY
ATTORNEYS 3,074,556
FLUID FILTERING MECHANISM
Oscar E. Rosaen, Grosse Pointe, Mich., assignor to The Rosaen Filter Company, Detroit, Mich., a corporation of Michigan
Filed Apr. 25, 1960, Ser. No. 24,330
4 Claims. (Cl. 210—195)

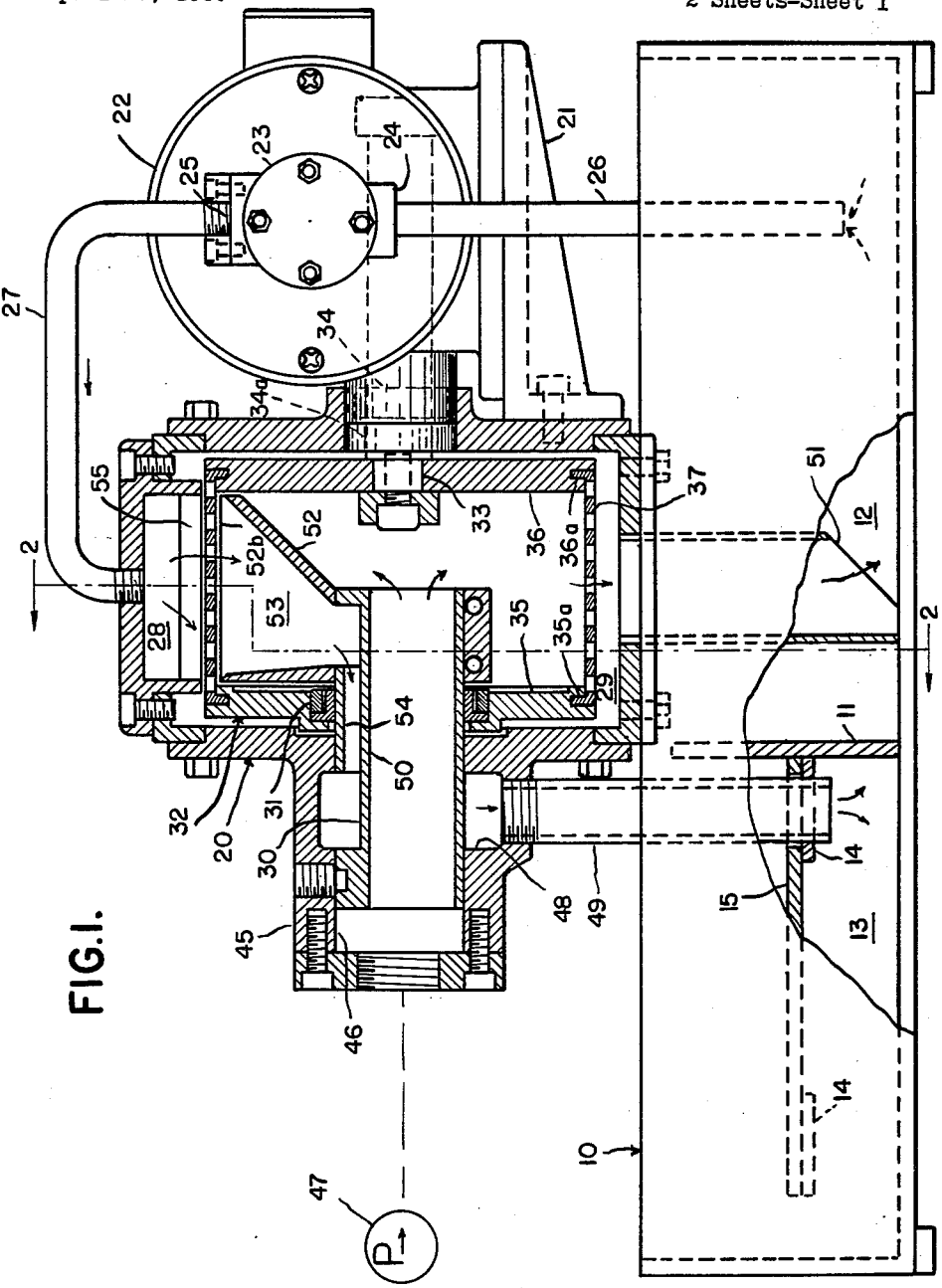

My invention relates to fluid filtering mechanisms and more particularly to a continuous flow filter having means for continuously dislodging foreign matter therefrom and separating such foreign matter from the fluid flowing through the filter.

Clogging of the pores of filters is quite a problem, particularly in systems which supply cooling and lubricating fluid to machinery wherein the fluid accumulates quantities of foreign matter which must be eliminated before re-using the fluid. Obviously, there is a limit to the capacity of any filter, and it is impractical to use extremely large filters in order to increase time between replacements. In many applications, the time and inconvenience involved in continually changing and/or cleaning filters may make it cheaper in the long run not to use filters at all but merely to use large reservoirs for the fluid, hoping that larger foreign particles will settle out, and to change fluid more often, but this is merely avoiding the issue, not solving it.

Some filter cleaning mechanisms have been attempted heretofore in which a brush or scraper is moved over the filter surface, but these devices usually defeat their own purpose by causing damage to the filter and/or actually embedding foreign matter more thoroughly in the filter screen.

An object of the present invention is to improve filtering systems by providing improved means operable to continuously dislodge foreign matter from the pores of the filter.

Another object of the invention is to prevent clogging of fluid filters by continuously ejecting a stream of fluid through a continuously changing portion of the filter in a direction opposite to normal fluid flow.

A further object of the invention is to improve fluid filtering by providing means for continuously dislodging foreign matter from the filter and for separating this matter from the filtered fluid.

For a more complete understanding of the invention, reference may be had to the accompanying drawings illustrating a preferred embodiment of the invention in which like reference characters refer to like parts throughout the several views and in which FIG. 1 is a partially cross-sectional view of the filtering system embodying the invention.

FIG. 2 is a cross-sectional view taken substantially on the line 2—2 of FIG. 1.

FIG. 3 is a fragmentary view of a perforated strip used in the body of the filter drum to be described.

FIG. 4 is a cross section taken substantially on the line 4—4 of FIG. 3, and

FIG. 5 is a fragmentary view of a filter material with the mesh enlarged for clarity as used with the perforated strip of FIGS. 3 and 4.

As thus illustrated, the filtering system comprises preferably a reservoir in the form of a tank 10 having a vertical partition 11 stopping short of the top edge of the tank and dividing same into a filtered fluid portion 12 and a settling portion 13. Ledges 14 are provided on the sides of the tank portion 13 to support a horizontal shelf 15 which extends from the partition 11 to near the other end of the tank portion 13. Communication between the upper and lower compartments may be made only around the outer end of the shelf 15, and communication between the portions 12 and 13 may be made only over the top of the partition 11 so that only clean or relatively clean surface fluid can pass from portion 13 to portion 12 and then only when the portion 13 is almost full. Dirt and/or other foreign matter will be substantially completely deposited underneath the shelf 15 in the portion 13.

A filter housing structure 20 is preferably mounted directly on the tank 10 and has a bracket 21 on which is mounted a motor 22 carrying a fluid pump 23 having an inlet 24 and an outlet 25. A pipe or conduit 26 connects the inlet 24 of the pump 23 with the filtered fluid portion 12 of the tank 15 and a conduit 27 connects the outlet 25 with a secondary inlet chamber 28 provided in the top of the housing structure 20.

The housing structure 20 has a filter chamber 29 into which extends a pipe structure 30 through an oil seal assembly 31 which is axially carried in one end of a filter structure 32. The other end of the filter structure 32 is drivingly connected to and carried by a drive shaft 33 extending through a bearing 34 and an oil seal 34a carried by the housing 20 to the motor 22 by which the shaft 33 is driven by any preferred gear arrangement providing the shaft with a relatively slow rotation.

The filter structure 32 comprises circular end plates 35 and 36 having peripheral grooves 35a and 36a respectively, and a cylindrical drum 37 supported by said end plates 35 and 36, the drum 37 being constructed from a perforated strip 38 and shown in FIGS. 3 and 4 as having inturned edges 39 which are pressed into the grooves 35a and 36a of the end plates. A strip of filtering material 40 as shown in FIG. 5 is wrapped around and secured to the strip 38.

The housing 20 preferably has an axially extending portion 45 supporting therein the pipe 30 and provided with a primary inlet chamber 46 to which unfiltered fluid is directed by any means such as a pump 47, and a secondary outlet chamber 48 openly connected by any means such as a pipe 49 to the settling portion 13 of the tank 10 beneath the shelf 15 and near the partition 11.

The pipe 30 is constructed with a primary passage 50 openly connecting the chamber 46 with the interior of the filter structure 32. The fluid is conducted through the porous drum 37 into the chamber 29, being filtered by the porous material 40, and the filtered fluid then flows out through a pipe 51 to the portion 12 of the tank 10. The inner end of the pipe 30 carries a radially extending collector element 52 which diverges outwardly as shown in FIG. 1 to traverse the length of the drum 37. One side of the element 52, as shown in FIG. 2, is bent as at 52a toward the other side which ends as at 52b closes the inner periphery of the drum 37. The element 52 has a passage 53 openly connected with a secondary passage 54 in the pipe 30. As seen in FIG. 1, the secondary outlet chamber 48 is openly connected to the passage 54.

The secondary inlet chamber 28 opens through a longitudinal slot 55 directed radially inwardly toward the collecting element 52, so that fluid, pumped by pump 23 will eject at relatively high pressure directly through a narrow longitudinal portion of the drum 37 in a direction opposite to fluid flow through the rest of the drum 37, dislodging foreign particles, dirt and sludge into the collecting element 52. Some of the primary fluid inside the drum 37 will sweep over the bent end 52a to assist in carrying this foreign matter into the passage 53, from whence it will be carried through the passage 54, the secondary outlet chamber 48, and the pipe 49 into the settling portion 13 of the tank 10 below the shelf 15.

The filter structure 32 being rotated continuously by the motor 22, the portion of the drum 37 subjected to the purging action of the secondary fluid from the slot 55 is always changing, so that the pores of the filter material 40 will always be clean, providing for uninterrupted continuous filtering of the primary fluid flowing outwardly through the drum 37.

With a continuously cleaned filter, it will be seen that relatively large filtering areas are not necessary, and constant changing of filters and/or fluid, with consequent periods of inoperation, will not be required. The fluid so filtered and collected in the tank portion 12, can be withdrawn for use by any means desired (not shown).

Although I have described only one preferred embodiment of my invention, it will be apparent to one skilled in the art to which the invention pertains that various changes and modifications may be made therein without departing from the spirit of the invention or the scope of the appended claims.

I claim:

1. A fluid filtering system comprising a filter means and a reservoir, means conducting fluid through said filter means in one direction discharging into said reservoir, a second means independently selectively operable to simultaneously conduct fluid through a portion only of said filter means in the opposite direction discharging into said reservoir and carrying foreign matter dislodged from said filter means, said reservoir having means separating the foreign matter from the second discharged fluid, means separating the first discharged fluid from the second discharged fluid, said reservoir comprising a tank having a partition dividing said tank into two compartments, the first of said fluid conducting means discharging filtered fluid into one of said compartments and the second fluid conducting means discharging the fluid having foreign matter into the other of said compartments, said compartments being openly connected over the top of said partition, and means conducting fluid from only the first compartment, into which is discharged the filtered fluid, to the second means conducting fluid through a portion only of said filter means, said second compartment having a horizontal shelf dividing the compartment into upper and lower portions and spaced at one end only from the end of said reservoir to openly connect the upper and lower portions, said fluid containing foreign matter being discharged only into said lower portion at a location remote from the open end of said shelf.

2. The system as defined in claim 1 and in which said second conducting means comprises a pump having an inlet and an outlet, means connecting said pump inlet with said reservoir and means connecting said pump outlet with said filter means.

3. The system as defined in claim 1 and in which said filter means comprises a housing having a filter chamber, an inlet and an outlet open to said chamber, a drum-shaped filter element disposed intermediate said inlet and said outlet and rotatably carried in said chamber, said second conducting means comprising means ejecting fluid through a small portion only of said filter element from the outlet to the inlet side thereof, means rotating said filter element relative to said ejecting means to continuously change the portion of the filter element through which said fluid is ejected, a collecting element disposed adjacent said ejecting means with the filter element portion therebetween whereby foreign particles dislodged from said filter element will enter said collecting element, said collecting element comprising a hollow elongated member having a slot extending parallel to the axis of rotation of said filter element and close to the surface thereof, the edge of the slot which the filter element surface passes first being spaced from the drum surface a greater distance than is the other edge of said slot.

4. The device as defined in claim 3 and in which said hollow member has a flat surface extending from the first mentioned slot edge substantially normal to the direction of the fluid ejected from said ejecting means and in the path thereof, said slot being offset slightly from the plane of flow of said ejected fluid.

References Cited in the file of this patent

UNITED STATES PATENTS

| | | |
|---|---|---|
| 1,950,466 | Wille et al. | Mar. 13, 1934 |
| 2,101,211 | Britton | Dec. 7, 1937 |
| 2,275,958 | Hagel | Mar. 10, 1942 |
| 2,351,712 | Sattele et al. | June 20, 1944 |
| 2,828,862 | Johnson | Apr. 1, 1958 |